United States Patent
Nakazawa

(10) Patent No.: US 7,535,201 B2
(45) Date of Patent: May 19, 2009

(54) UNINTERRUPTIBLE POWER SUPPLY SYSTEM

(75) Inventor: Hiroshi Nakazawa, Tokyo (JP)

(73) Assignee: Densei-Lambda Kabushiki Kaisha, Shingawa-ku, Tokyo (JP)

( * ) Notice: Subject to any disclaimer, the term of this patent is extended or adjusted under 35 U.S.C. 154(b) by 419 days.

(21) Appl. No.: 11/538,859

(22) Filed: Oct. 5, 2006

(65) Prior Publication Data

US 2008/0084185 A1 Apr. 10, 2008

(51) Int. Cl.
*H02J 7/00* (2006.01)
(52) U.S. Cl. ............... 320/133; 320/155; 320/157
(58) Field of Classification Search .......... 320/133, 320/155, 157
See application file for complete search history.

(56) References Cited

U.S. PATENT DOCUMENTS 5,602,462 A * 2/1997 Stich et al. ............... 323/258

2004/0164712 A1 * 8/2004 Lin et al. ................... 320/136

FOREIGN PATENT DOCUMENTS

| JP | 62-025834 | 2/1987 |
| JP | H01-100223 | 7/1989 |
| JP | H10-145981 | 5/1998 |
| JP | 2002-058170 | 2/2002 |

* cited by examiner

*Primary Examiner*—Akm E. Ullah
*Assistant Examiner*—Aaron Piggush
(74) *Attorney, Agent, or Firm*—Novak Druce & Quigg; J. Rodman Steele; Gregory Lefkowitz

(57) ABSTRACT

There is provided an uninterruptible power supply system capable of preventing life shortening of a lithium-ion secondary battery attributable to its overcharge over the whole period of its use. At the start of use of the lithium-ion secondary battery 22, a charging voltage is set comparatively low. On the other hand, as the lithium-ion secondary battery 22 comes closer to an end of its life, its charging voltage becomes higher. A charging control means 37 variably sets the charging voltage applied to the lithium-ion secondary battery 22 so as to realize a discharge duration thereof may become slightly longer than a backup time required for the system and hence life shortening of the lithium-ion secondary battery 22 attributable to overcharge can be prevented.

13 Claims, 12 Drawing Sheets

UNINTERRUPTIBLE POWER SUPPLY SYSTEM

BACKGROUND OF THE INVENTION

1. Field of the Invention

The present invention pertains to an uninterruptible power supply system equipped with a rechargeable and dischargeable lithium-ion secondary battery acting as a backup power source of a power supply unit having a main power source unit built-in.

2. Related Prior Art

In general, when an input voltage from a commercial power source is normally supplied, this sort of the uninterruptible power supply system supplies necessary direct currents or alternate currents from the main power source of the power supply unit to a load with a secondary battery being charged through the main power source. In contrast, when an input voltage has been reduced seriously or power interruption has occurred, the secondary battery acting as the backup power source discharges to keep on its power supply. As the secondary battery employed here, a lead battery has been hitherto employed due mainly to its low price and easiness in the management of charging and discharging. There are, however, problems that the lead battery requires a larger housing space and is extremely heavy. Further, various environmental problems of lead contamination are unavoidable. For solving these problems, Japanese unexamined application publication No. 2002-58170 proposes an uninterruptible power supply system that employs a lithium-ion secondary battery instead of the lead battery as a backup power source. The lithium-ion secondary battery employed here comprises battery modules consisting of a plurality of series-connected battery cells. A battery protection circuit for preventing overcharge and over discharge is also built in this uninterruptible power supply system proposed.

According to the above-mentioned conventional uninterruptible power supply system, a backup time to keep on power supply at the time of voltage reduction or power interruption depends on the service (or discharge) capacity of the secondary battery. This service capacity, however, lowers gradually as the secondary battery is used over a long period of time. FIG. 12 shows respective characteristic of charging voltage V1 and service capacity P1 during the duration of service of the secondary battery. Heretofore, the service capacity sustainable at the end of life of the secondary battery has been estimated and then the charging voltage $V_1$ supplied from the main power source to the secondary battery has been set so as to be able to sustain the service capacity $P_1$ enough to ensure at least the backup time required for the system even at the end of life of the secondary battery.

However, in reality, the charging voltage $V_1$ has heretofore been set at a fixed value in the main power source regardless of how long the secondary battery has been operated. Hence, in early phase of the life of the secondary battery, charging is carried out with the service capacity $P_1$ of the secondary battery being more than enough for the required backup time (see "excessive setting" shown in FIG. 12). Stated differently, since the charging voltage V1 applied to the secondary battery is preliminarily set at a higher value than actually needed in expectation of deterioration with age in the secondary battery, the lithium-ion secondary battery whose life is markedly shortened when overcharged in particular has a problem that the life of the secondary battery, eventually that of the uninterruptible power supply system is seriously shortened.

SUMMARY OF THE INVENTION

In view of the above-mentioned problems, it is, therefore, an object of the present invention to provide an uninterruptible power supply system that is capable of preventing the life shortening of a lithium-ion secondary battery due to overcharge over the whole duration of service of the lithium-ion secondary battery.

According to the present invention, there is provided an uninterruptible power supply system in which the lithium-ion secondary battery is charged when an input voltage is normal and is discharged to supply electric power to a load at the time of voltage reduction and power interruption, wherein the uninterruptible power supply system is equipped with a timing means for counting an elapsed time from when the lithium-ion secondary battery comes into service and a charging control means for increasing a charging voltage applied to the lithium-ion secondary battery as the elapsed time increases.

Accordingly, the charging voltage is set comparatively low at the start of use of the lithium-ion secondary battery, while the charging voltage becomes higher as the lithium-ion secondary battery comes closer to an end of its life. That is, the charging control means variably sets the charging voltage of the lithium-ion secondary battery so that a discharge duration thereof may become slightly longer than a backup time required for the system over the whole duration of service of the lithium-ion secondary battery and hence the life shortening of the lithium-ion secondary battery due to its overcharge can be prevented.

According to another aspect of the present invention, there is provided an uninterruptible power supply system in which a lithium-ion secondary battery is charged when an input voltage is normal and is discharged to supply the electric power to a load at the time of voltage reduction and power interruption, wherein the uninterruptible power supply system is equipped with a discharge duration obtaining means for periodically discharging the lithium-ion secondary battery and then counting a discharge duration taken for a terminal voltage of the lithium-ion secondary battery to drop to a preset voltage; and a charging control means for variably controlling a charging voltage applied to the lithium-ion secondary battery so that the discharge duration comes closer to a preset time.

Accordingly, every time the lithium-ion secondary battery is discharged, the discharge duration obtaining means counts the discharge duration taken for the terminal voltage of the lithium-ion secondary battery to drop to the preset voltage. The charging control means variably controls the charging voltage applied to the lithium-ion secondary battery so that the discharge duration comes closer to the preset time required for the system. In sum, the charging control means variably sets the charging voltage of the lithium-ion secondary battery so that the discharge duration becomes slightly longer than a backup time required for the system over the whole duration of service of the lithium-ion secondary battery and hence the life shortening of the lithium-ion secondary battery due to overcharge can be prevented.

According to the present invention, such an uninterruptible power supply system can be provided that is capable of preventing the life shortening of a lithium-ion secondary battery due to overcharge over a whole duration of service of the lithium-ion secondary battery.

BRIEF DESCRIPTION OF THE DRAWINGS

The invention will be more readily understood by reference to the following description, taken with the accompanying drawings, in which.

DETAILED DESCRIPTION OF THE PREFERRED EMBODIMENT

Hereunder is a detailed description of preferred embodiments of an uninterruptible power supply system in the present invention with reference to the appended drawings.

Figure 1:
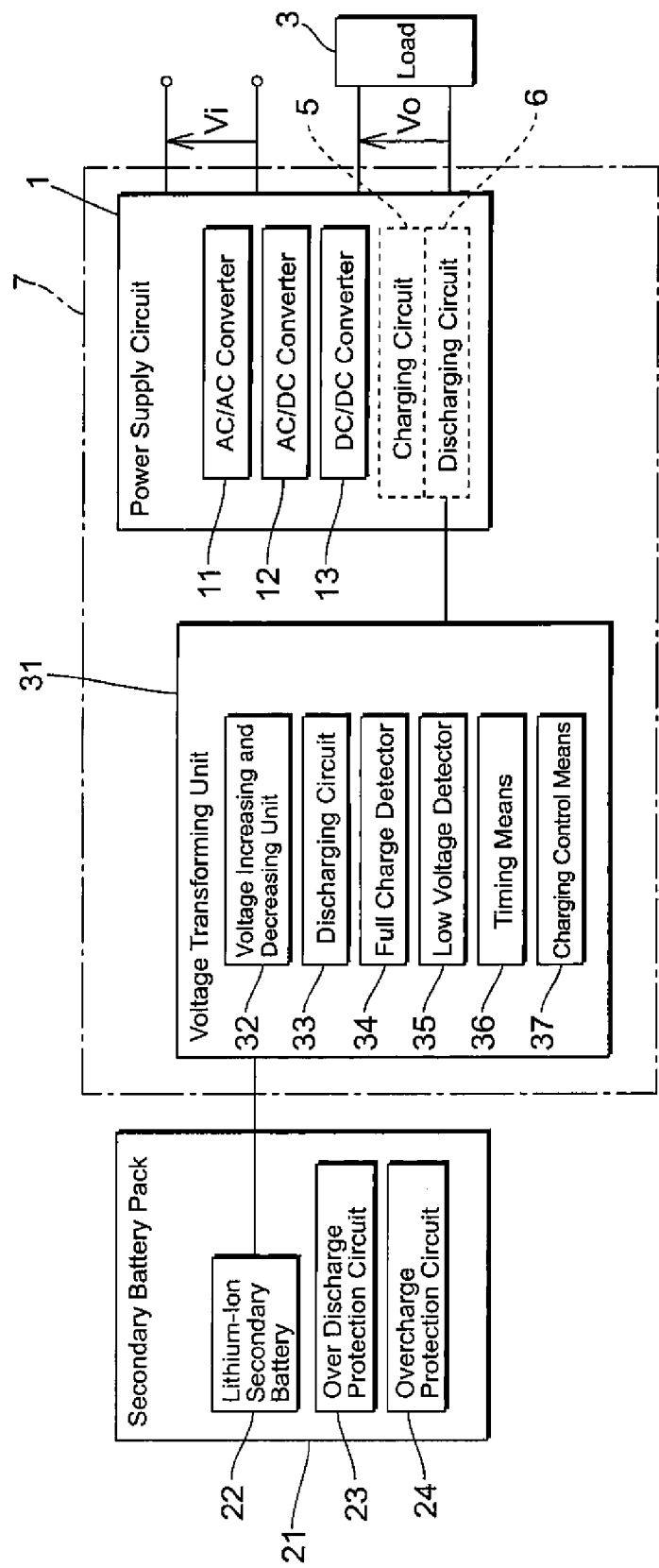
FIG. 1 is a block diagram of the uninterruptible power supply system in the first embodiment showing a preferred embodiment in the present invention.

Hereinafter, the uninterruptible power supply system according to a first embodiment of the present invention is described in detail with reference to FIGS. 1 to 5. In FIG. 1 showing an outline configuration of the whole of the system, reference number 1 denotes a power supply circuit acting as a main power source to which an alternating input voltage $V_i$ is applied from, e.g., a commercial power source 51 (see FIG. 4). One or more loads 3 to which an alternating or direct-current output voltage $V_o$ is applied is connected to the power supply circuit 1. Reference number 21 denotes a secondary battery pack mounted on the system as a backup power source. In this embodiment, besides the lithium-ion secondary battery 22 acting as a secondary battery, an over discharge protection circuit 23 for preventing the over discharge of the lithium-ion secondary battery 22 and overcharge protection circuit 24 for preventing the overcharge thereof are preferably built in. A charging circuit 5 for charging the lithium-ion secondary battery 22 when an input voltage $V_i$ is normal and a discharging circuit 6 for discharging the lithium-ion secondary battery 22 to supply electric power to the loads 3 at the time of the input voltage $V_i$ reduction or power interruption are built in the power supply circuit 1.

The power supply circuit 1 is accordingly incorporated with an AC/AC converter 11 for converting the alternating input voltage $V_i$ into the alternating output voltage $V_o$ required for the loads 3, an AC/DC converter 12 for converting the alternating input voltage $V_i$ into an increased or decreased direct-current output voltage $V_o$, and a DC/DC converter 13 for converting the direct-current voltage obtained by the AC/DC converter 12 into the direct-current voltage $V_o$ required for the loads 3.

Reference number 31 denotes a novel voltage transforming unit according to the present invention. The voltage transforming unit 31 is connected between the lithium-ion secondary battery 22 and the power supply circuit 1 acting as the main power source. Here, it should be noted that no modification to inside components of the power supply circuit 1 is necessary even when any secondary battery pack 21 is mounted on the system due to the respective functions built in the voltage transforming unit 31.

Figure 2:
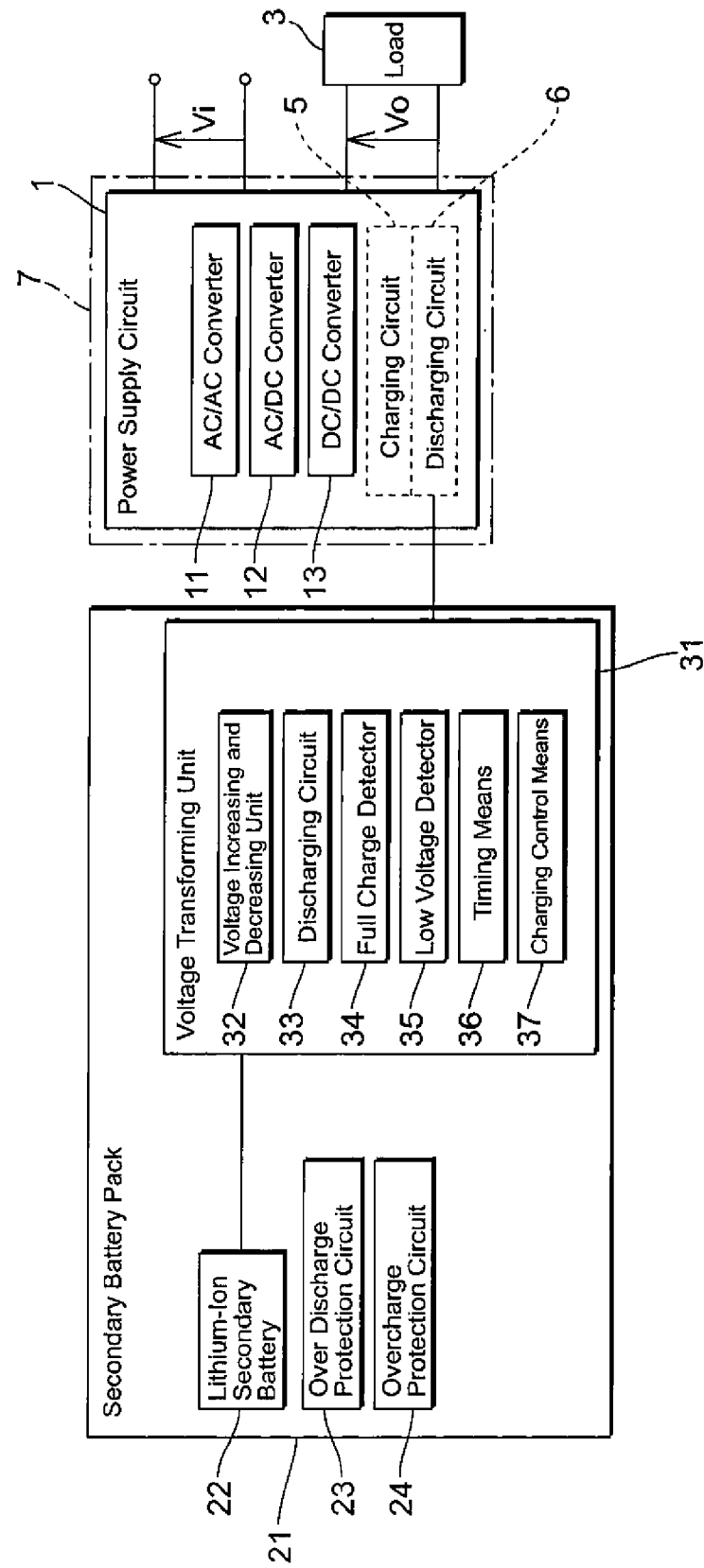
FIG. 2 is a block diagram of the uninterruptible power supply system showing a modified example of FIG. 1 in the first embodiment.
Figure 3:
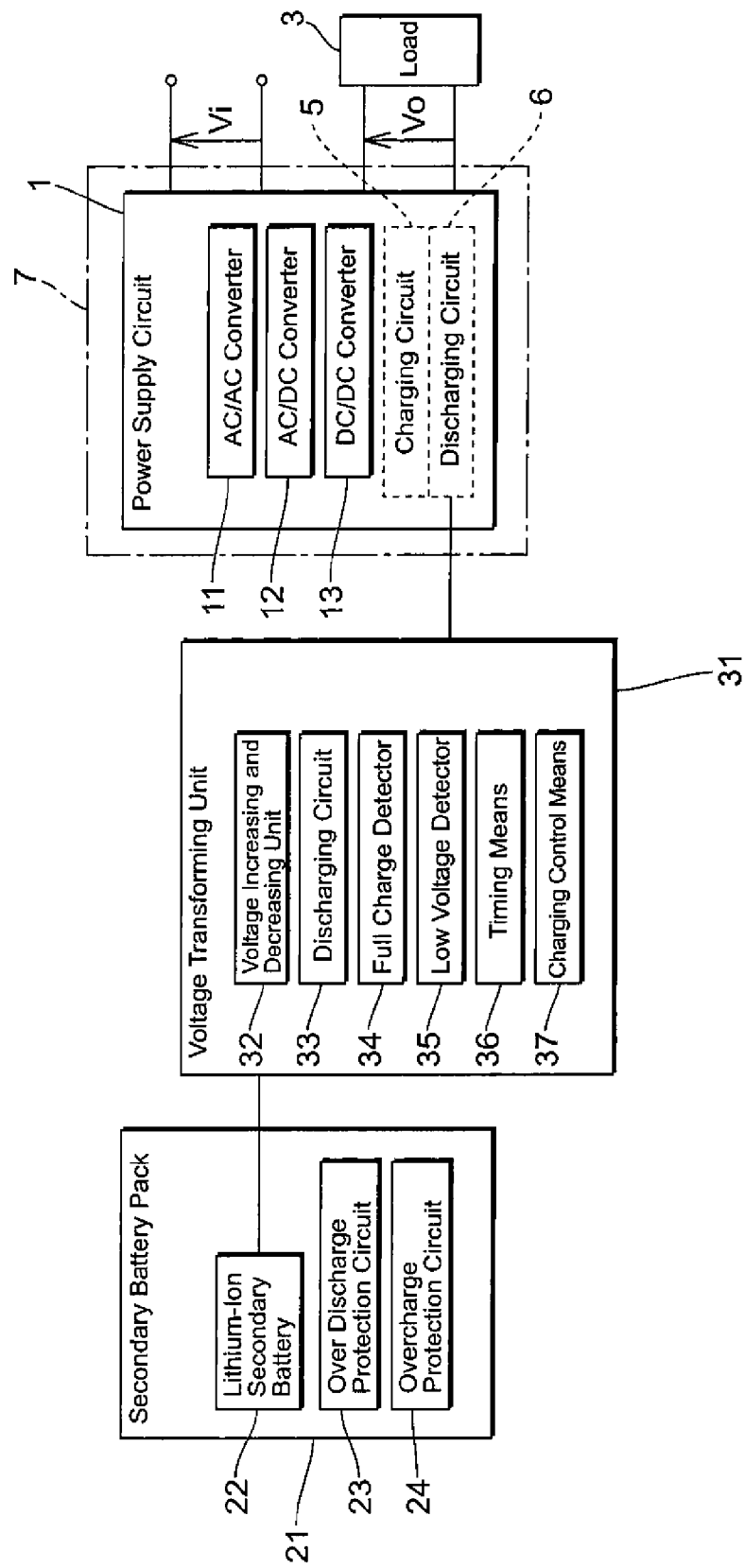
FIG. 3 is a block diagram of the uninterruptible power supply system showing a further modified example of FIG. 1 in the first embodiment.

The voltage transforming unit 31 is provided, as an independent module, separately from the power supply circuit 1 and the secondary battery pack 21. In an example shown in FIG. 1, the voltage transforming unit 31 is built in a main body case 7 for housing the power supply circuit 1 and acting as a power supply unit. However, as shown in FIG. 2, for example, the voltage transforming unit 31 may be built in a boxy secondary battery pack 21 independent of the main body case 7. In both cases, a space for housing the voltage transforming unit 31 is provided inside the main body case 7 or secondary battery pack 21. If such a space cannot be ensured, it is preferable that the voltage transforming unit 31 be connected independently between the main body case 7 and the secondary battery pack 21 by, for example, using an external connector, as shown in FIG. 3. Alternatively, although in any of the examples shown in FIGS. 1 to 3, the secondary battery pack 21 is provided separately outside the main body case 7, the secondary battery pack 21 may be housed inside the main body case 7. In that case also, the voltage transforming unit 31 may be provided inside the main body case 7 or the secondary battery pack 21. Otherwise, the voltage transforming unit 31 may be provided outside and separately from the main body case 7 of a battery pack self-contained type. As described above, the voltage transforming unit 31 of the present embodiment may adopt an optimal configuration in accordance with dimensions, forms, etc. of the main body case 7 and the secondary battery pack 21.

As shown in FIGS. 1 to 3, the voltage transforming unit 31 comprises a voltage increasing and decreasing unit 32 for increasing or decreasing a supply voltage applied from the power supply circuit 1 to the lithium-ion secondary battery 22 to an optimal voltage (an optimal charging voltage) for charging the lithium-ion secondary battery 22, a discharging circuit 33 for discharging the lithium-ion secondary battery 22 at the time of the reduction of input voltage $V_i$ or power interruption, a full charge detector 34 for stopping power supply to the lithium-ion secondary battery 22 to allow the lithium-ion secondary battery 22 to perform self-discharge when having detected the lithium-ion secondary battery 22 has been charged fully, and a low voltage detector 35 for starting the power supply to the lithium-ion secondary battery 22 when having detected that the terminal voltage of the lithium-ion secondary battery 22 has dropped to a predetermined value. In the meantime, the structure described above applies to a hereinafter described second embodiment as well.

In the present embodiment, the voltage transforming unit 31 is, in addition to the system described above, equipped with a timing means 36 for counting an elapsed time from when the lithium-ion secondary battery 22 came into service;

and a charging control means 37 for increasing a charging (supply) voltage applied to the lithium-ion secondary battery 22 as elapsed time counted by the timing means 36 increases, respectively.

Figure 4:
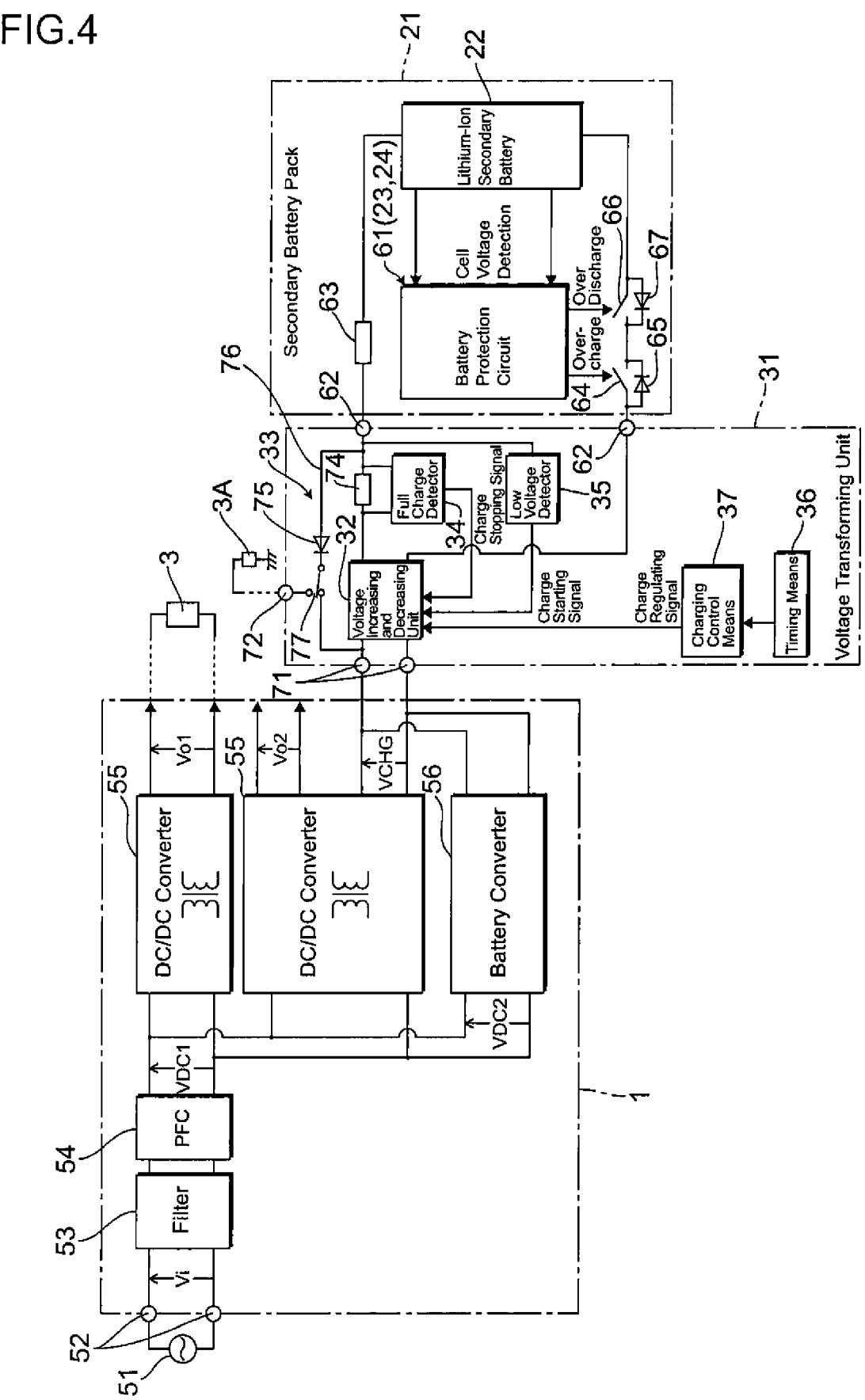
FIG. 4 is a more detailed block diagram of the uninterruptible power supply system in the first embodiment.

FIG. 4 shows the uninterruptible power supply system in more detail. In the figure, reference number 51 denotes a commercial power source, connected to input terminals 52, 52 of the power supply circuit 1, acting as a supply source of an alternating input voltage $V_i$, while the input voltage $V_i$ is converted into a direct-current voltage $V_{DC1}$ increased by a filter 53 including a rectifier bridge or the like and a PFC (power factor compensating) circuit 54 consisting of a step-up chopper circuit. Namely, the filter 53 and the PFC circuit 54 correspond to the AC/DC converter 12 described above. Numeral number 55 denotes a DC/DC converter for converting the direct-current voltage $V_{DC1}$ into one or more direct-current output voltages $V_{01}$, $V_{02}$ suitable to the loads 3 and this converter correspond to the above-mentioned DC/DC converter 13. These direct-current output voltages $V_{01}$, $V_{02}$ are supplied from output terminals (not shown) provided in the main body case 7 to the loads 3. In the meantime, the number of the DC/DC converters 55 and direct-current output voltages $V_{01}$, $V_{02}$ that can be output from the DC/DC converter 55 is not limited to that in the present embodiment.

The DC/DC converter 55 outputs a supply voltage $V_{CHG}$ for charging the lithium-ion secondary battery 22 in addition to the direct-current output voltages $V_{01}$, $V_{02}$. Numeral number 56 denotes a battery converter connected so as to bypass the DC/DC converter 55 for outputting this supply voltage $V_{CHG}$ and at the time of the input voltage $V_i$ reduction and power interruption, the battery converter 55 increases and converts the supply voltage output from the lithium-ion secondary battery 22 to supply the direct-current voltage $V_{DC2}$ to an input side of the DC/DC converter 55. As described above, the power supply circuit 1 shown here functions as an AC/DC unit for converting the alternating input voltage $V_i$ into the direct-current output voltages $V_{01}$, $V_{02}$. The power supply circuit 1, however, may function as an AC/AC unit for supplying the alternating output voltage to the loads 3.

The secondary battery pack 21 is mounted with the lithium-ion secondary battery 22 consisting of a plurality of battery cells and besides is incorporated with a battery protection circuit 61 that detects a voltage generated between the cells to monitor whether or not the lithium-ion secondary battery 22 has been subjected to over discharge or overcharge. That is, the battery protection circuit 61 corresponds to the over discharge protection circuit 23 and the overcharge protection circuit 24. Terminals of the lithium-ion secondary battery 22 are connected to battery connecting terminals 62, 62 of the voltage transforming unit 31. A fuse 63 for disconnecting the lithium-ion secondary battery 22 from the voltage transforming unit 31 when an overcurrent has occurred, a first switching element 65 that blocks a current flowing from the voltage transforming unit 31 into the lithium-ion secondary battery 22 when the overcharge protection circuit 24 has detected the overcurrent of lithium-ion secondary battery 22 and is parallel-connected to a diode 64, and a second switching element 67 that blocks current supply from the lithium-ion secondary battery 22 to the voltage transforming unit 31 when the over discharge protection circuit 23 has detected the overcurrent of the lithium-ion secondary battery 22 and is parallel-connected to a diode 66 are each connected to a voltage line laid on from the lithium-ion secondary battery 22 to the battery connecting terminals 62, 62.

In addition to the battery connection terminals 62, 62 for connecting the secondary battery pack 21, the voltage transforming unit 31 is equipped with, as terminals exposed to the outside, main power supply connecting terminals 71, 71 connected to a voltage line where the supply voltage $V_{CHG}$ of the power supply circuit 1 is generated and a discharging terminal 72 connected directly to an arbitrary load 3A other than the loads 3 to which the direct-current output voltages $V_{01}$, $V_{02}$ are applied. The voltage increasing and decreasing unit 32 functions as a charging circuit for charging the lithium-ion secondary battery 22 and further is designed and regulated so as to increase or decrease the supply Voltage $V_{CHG}$ from the DC/DC converter 55 in conformity with a specification of a secondary battery inside the secondary battery pack 21 built in as a backup power source. Specifically, when an optimal charging voltage of the secondary battery is preliminarily known to be lower than the supply voltage $V_{CHG}$ from the DC/DC converter 55, a step-down chopper power source (a voltage decreasing unit) is built in for stepping down the supply voltage $V_{CHG}$ to the optimal charging voltage, whereas when the optimal charging voltage of the secondary battery is preliminarily known to be higher than the supply voltage $V_{CHG}$ from the DC/DC converter 55, a step-up chopper power source (a voltage increasing unit) is built in for stepping up the supply voltage $V_{CHG}$ to the optimal charging voltage.

Further, in order to set and regulate a voltage applied from the voltage increasing and decreasing unit 32 to the secondary battery inside the secondary battery pack 21 as the optimal charging voltage of the lithium-ion secondary battery 22, there may be provided a means for detecting an input voltage (the supply voltage $V_{CHG}$) applied to the voltage transforming unit 31 or a means for detecting a terminal voltage of the secondary battery for a predetermined input voltage. Furthermore, a battery discriminating means for physically discriminating a type of the secondary battery may be provided to allow either the voltage decreasing unit or the voltage increasing unit to operate depending on the type of the secondary battery employed. Thus, for any secondary batteries, the optimal voltage can be supplied from the voltage transforming unit 31 to the secondary battery pack 21.

The full charge detector 34 is parallel-connected to a resistor 74 for detecting a charging current supplied from the voltage increasing and decreasing unit 32 to the lithium-ion secondary battery 22. The resistor 74 acting as a current detection element may be replaced by the other element. When the lithium-ion secondary battery 22 has been fully charged, the full charge detector 34 outputs a charging stop signal for stopping the operation of the voltage increasing and decreasing unit 32 to the voltage increasing and decreasing unit 32, based on the charging current detected by the resistor 74, flowing into the lithium-ion secondary battery 22. Further, when having detected a low voltage state where the terminal voltage of the lithium-ion secondary battery 22 has dropped to a predetermined value by self-discharge, the low voltage detector 35 outputs a charging start signal for starting the operation of the voltage increasing and decreasing unit 32 to the voltage increasing and decreasing unit 32. In the meantime, a full charge detection level by the full charge detector 34 can be easily and variably set depending on specifications of a secondary battery employed and power supply circuit 1.

A discharging circuit 33 comprises a discharging line 76 that bypasses a series circuit comprising the voltage increasing and decreasing unit 32 and the resistor 74 and passes through one battery connecting terminal 62 acting as an output terminal of the voltage transforming unit 31 and then is connected to one main power source terminal 71 acting as an input terminal of the voltage transforming unit 31 via a diode 75. The diode 75 has a function to block the supply voltage $V_{CHG}$ output from the power supply circuit 1 from being supplied directly to the secondary battery pack 21 side not via the voltage increasing and decreasing unit 32. Further, in the mid-course of the discharging line 76, a changeover switch 77 is preferably provided as a switching means for supplying the terminal voltage of the lithium-ion secondary battery 22 either to the main power source connecting terminals 71 or to the discharging terminal 72. Consequently, it can be selected whether the power supply from the lithium-ion secondary battery 22 is allowed to go through the power supply circuit 1 or not in conformity to a product (a load) used.

In addition, when the supply voltage $V_{CHG}$ is lower than the optimal charging voltage and therefore an increase in voltage is performed in the voltage increasing and decreasing unit 32, even if the alternating input voltage $V_i$ is being normally supplied, a current flows into the main power source connecting terminals 71 through the diode 75 and thus the secondary battery makes no transition to a charging mode for charging a secondary battery. Hence, in this case, it is preferable that a cathode of the diode 75 is connected directly to the discharging terminal 72 to disconnect a charging line and a discharging line from each other.

Further, the voltage transforming unit 31 described here is equipped with a timing means 36 and a charging control means 37. The timing means 36 starts to count an elapsed time of the lithium-ion secondary battery 22 concomitantly with the start of the use of the lithium-ion secondary battery 22. There may be, however, provided, e.g., a detection means for detecting mechanically that the secondary battery pack 21 has been mounted on the voltage transforming unit 31 and a manually-operable switch means. Further, electrically, the timing means 36 may continues to count, by using the resistor 74, the elapsed time while a charging current is flowing through the resistor 74. In any case, a resetting means is preferably provided that is capable of resetting the count of the elapsed time when having replaced the secondary battery pack 21. This permits suitable charging voltage supply to continue even after having replaced the secondary battery pack 21.

Furthermore, based on the elapsed time of the lithium-ion secondary battery 22 counted by the timing means 36, the charging control means 37 outputs a charging voltage regulating signal for setting and regulating optimally the charging voltage applied to the lithium-ion secondary battery 22 to the voltage increasing and decreasing unit 32 consisting of a step-up chopper circuit or step-down chopper circuit.

Next, an operation of the above-mentioned system is described. When the alternating input voltage $V_i$ from the commercial power source 51 is normally supplied to the power supply circuit 1, the alternating input voltage $V_i$ is converted into the direct-current voltage $V_{DC1}$ stepped up by the filter 53 and PFC circuit 54. Then, the direct-current voltage $V_{DC1}$ output from the PFC circuit 54 is applied to the DC/DC converter 55 and the supply voltage $V_{CHG}$ for charging the lithium-ion secondary battery 22 is generated from the DC/DC converter 55 as well as applying the direct-current voltages $V_{o1}$, $V_{o2}$ obtained from the DC/DC converter 55 to the loads 3 connected to the main body case 7. Additionally, these direct-current voltages $V_{o1}$, $V_{o2}$ and supply voltage $V_{CHG}$ have been stabilized by a feedback circuit (not shown) built in the DC/DC converter 55.

At the same time, when the electric power is intended to be supplied to the loads 3 for a given length of time even at the time of the alternating input voltage $V_i$ reduction or power interruption, the secondary battery pack 21 shown in FIGS. 1 to 4 is mounted. The power supply circuit 1 described here is designed with a specification suitable to charge and discharge a lead rechargeable battery 4 produced by the conventional art. Specifically, the supply voltage $V_{CHG}$ output from the DC/DC converter 55 is set at DC 27V that is an optimal charging voltage of the lead battery, while when the alternating input voltage $V_i$ is applied to the input terminals 52, 52, the supply voltage $V_{CHG}$ is output constantly from the DC/DC converter 55. Hence, when a lead battery 4 whose optimal charging voltage is DC 27 V is employed, terminals of the lead battery 4 may be connected not via the voltage transforming unit 31 but directly to a voltage line of the supply voltage $V_{CHG}$ of the power supply circuit 1.

In contrast, when the lithium-ion secondary battery 22 other than the lead battery 4 is employed in consideration of environmental issues, if the lithium-ion secondary batter 22 is connected directly to the power supply circuit 1, the supply voltage $V_{CHG}$ of 27V is supplied constantly to the lithium-ion secondary battery 22, with a result that a life of the lithium-ion secondary battery 22 is markedly shortened as the optimal charging voltage of the lithium-ion secondary battery 22 is roughly 24.5V. Then, when secondary batteries different in specification are employed, the voltage transforming unit 31 is allowed to intervene between the power supply circuit 1 and the lithium-ion secondary battery 22. As a result, the supply voltage $V_{CHG}$ output from the DC/DC converter 55 is converted into the optimal voltage 24.6 V by the voltage increasing and decreasing unit 32 (in this case, only a step-down function may be provided) to supply the direct-current voltage stepped down to the lithium-ion secondary battery 22. Consequently, even if inside components of the supply circuit 1 are not modified, merely by building in the voltage transforming unit 31 accepting the secondary battery pack 21, the lithium-ion secondary battery 22 can be charged with the optimal voltage.

Further, the full charge detector 34 provided in the voltage transforming unit 31 is monitoring whether the lithium-ion secondary battery 22 has been fully charged or not by a decrease in a charging current flowing through the resistor 74. When having detected that the Lithium-ion secondary battery 22 had been fully charged, the full charge detector 34 outputs a charge stopping signal for stopping an operation of the voltage increasing and decreasing unit 32 consisting of the step-down chopper circuit. Thus, when the lithium-ion secondary battery 22 has been fully charged, the power supply from the voltage increasing and decreasing unit 32 to the lithium-ion secondary battery 22 is stopped. Hence, the overcharge of the lithium-ion secondary battery 22 can be prevented. A terminal voltage of the lithium-ion secondary battery 22 is gradually decreased by self-discharge. When the terminal voltage is decreased to a predetermined value corresponding to a backup guaranteeing time of the loads 3, the low voltage detector 35 provided inside the voltage transforming unit 31 outputs a charge starting signal for starting an operation of the voltage increasing and decreasing unit 32. Hence, even at the time of the alternating input voltage $V_i$ reduction and power interruption when the self-discharge of the Lithium-ion secondary battery 22 is being employed, the power supply can be continued over a period of time longer than a backup guaranteeing time.

In addition, even when the lead battery whose optimal charging voltage is different from the direct-current voltage 27V is employed as a secondary battery, a differently-specified voltage transforming unit 31 not incorporated with the full voltage detector 34 and low voltage detector 35 may be mounted. That is to say, the voltage transforming unit 31 described here may be preferably prepared in one or more types depending on specifications (an optimal charging voltage, a self-discharge characteristic or the like) of secondary batteries employed.

At the time of a alternating input voltage $V_i$ reduction and power interruption with the voltage transforming unit 31 built in, the supply voltage $V_{CHG}$ applied from the DC/DC converter 55 to the main power source connecting terminals 71 of the voltage transforming unit 31 is also reduced. Then, if a cathode of the diode 75 is connected to the main power source connecting terminals 71 by means of the changeover switch 77, the diode 75 conducts to supply the electric power from the lithium-ion secondary battery 22 to the battery converter 56 of the power supply circuit 1. Receiving this electric power, the battery converter 56 increases the supply voltage from the lithium-ion secondary battery 22 to a direct-current voltage $V_{DC2}$ of the same level approximately as the direct-current voltage $V_{DC1}$ from the PFC circuit 54 to supply the direct-current voltage $V_{DC2}$ to an input side of the DC/DC converter 55. Consequently, the loads 3 connected to an output side of the DC/DC converter 55 is continued to be supplied with the electric power of the lithium-ion secondary battery 22. Further, if the cathode of the diode 75 is connected to the discharge terminal 72 by means of the changeover switch 77, the electric power is supplied not to the load 3 connected to the DC/DC converter 55 but to a different load 3A connected to the discharge terminal 72. In this manner, with a combination of the discharge terminal 72 and changeover switch 77, the electric power from the lithium-ion secondary battery 22 can be supplied selectively to any one of the load 3 and load 3A. When the supply voltage $V_{CHG}$ is, however, lower than the terminal voltage of the lithium-ion secondary battery 22, the cathode of the diode 75 must be connected directly to the discharge terminal 72 as the voltage increasing and decreasing unit 32 has a voltage increasing function.

Figure 5:
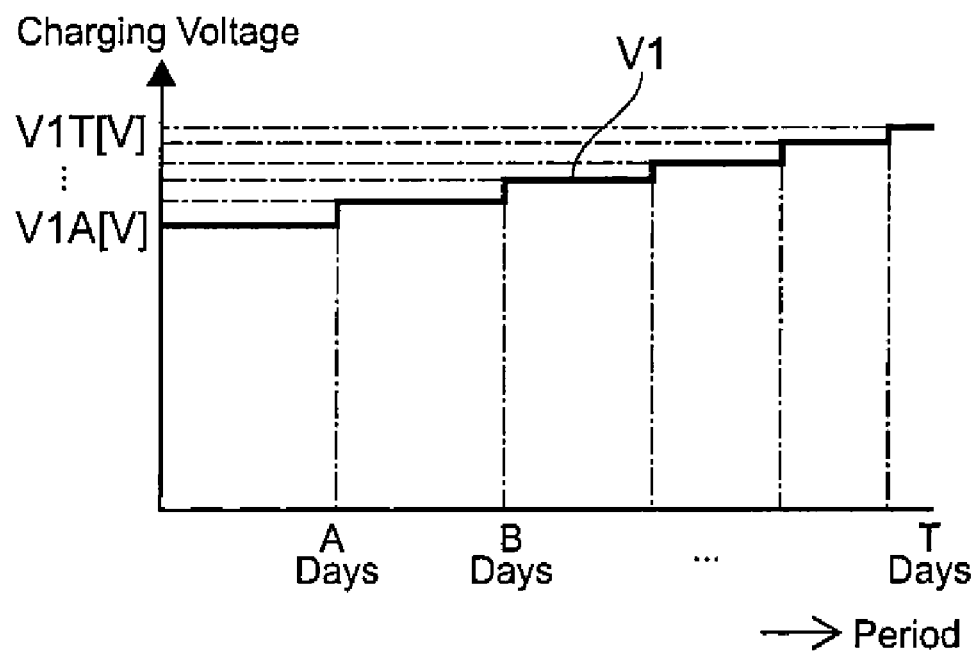
FIG. 5 is a graph showing charging voltage characteristics during duration of service of a secondary battery in the first embodiment.

Next is a description of operations of the timing means 36 and charging control means 37 that are provided in the voltage transforming unit 31 with reference to FIG. 5. In the figure, V1 denotes the charging voltage from the voltage increasing and decreasing unit 32 to the lithium-ion secondary battery 22. In the charging control means 37, information on the optimal charging voltage is preliminarily stored that can satisfy the requested charging specifications depending on duration of service based on deterioration property with age in the lithium-ion secondary battery 22.

When having started to use the interruptible power supply, the timing means 26 counts, by using a timer built in, an elapsed time from the start of use of the system or eventually the lithium-ion secondary battery 22. When the elapsed time obtained by the timing means 36 has exceeded a predetermined period of time (e.g., every few days), the charging control means 37 outputs a charging regulating signal for forcedly increasing the charging voltage to the lithium-ion secondary battery 22 higher than ever before to the voltage increasing and decreasing unit 32. Thus, the charging voltage of the lithium-ion secondary battery 22 is increased in incremental step as duration of service of the system increases as shown in FIG. 5.

In other words, there is little or no deterioration in battery at the start of use of the lithium-ion secondary battery 22 and hence if the charging voltage applied to the lithium-ion secondary battery 22 is set low, the backup time of the load 3 can satisfy the required specifications at the time of an input voltage $V_i$ reduction and power interruption. The deterioration in battery, however, occurs as duration of service of the system is accumulated and hence in this case the charging voltage applied to the lithium-ion secondary battery 22 is set gradually high so as to be able to hold the backup time for satisfying the required specifications. This setting is performed every preset time. Thus, an optimal charging voltage depending on the backup time can be periodically held to prevent life shortening of the lithium-ion secondary battery 22 attributable particularly to the overcharge at an initial stage of its use, and thus an advantage to employing the lithium-ion secondary battery 22 as a backup power source can be brought out over a long period of time.

In the present embodiment as described above, there is provided an uninterruptible power supply system that charges the lithium-ion secondary battery 22 when input voltage $V_i$ is normal and discharges the lithium-ion secondary battery 22 to supply electric power to the loads 3 at the time of the input voltage $V_i$ reduction and power interruption. The uninterruptible power supply system is equipped with a timing means 36 for counting an elapsed time from the start of use of the lithium-ion secondary battery 22 and a charging control means for increasing a charging voltage applied to the lithium-ion secondary battery 22 as the elapsed time increases.

In this instance, the charging voltage is set comparatively low at the start of use of the lithium-ion secondary battery. The charging voltage, however, becomes higher as the lithium-ion secondary battery comes closer to an end of its life. That is, the charging control means 37 variably sets the charging voltage of the lithium-ion secondary battery so that discharge duration becomes slightly longer than a backup time required for the system over the whole duration of service of the lithium-ion secondary battery and hence the life shortening of the lithium-ion secondary battery 22 due to its overcharge can be prevented.

Further, a life pre-announcing display for notifying that the lithium-ion secondary battery 22 has come close to its end of life, a battery replacement display for notifying the timing for battery replacement, a display for notifying a present backup possible time or the like may be displayed on a display unit (not shown) using information on elapsed time counted by the timing means 36. Furthermore, electric power consumption of the voltage increasing and decreasing unit 32 acting as the charging circuit of the lithium-ion secondary battery 22 can be reduced without applying an overcharging voltage to the lithium-ion secondary battery 22.

Next is a description of a second embodiment of an uninterruptible power supply in the present invention with reference to FIGS. 6 to 11. FIGS. 6 to 9 correspond to FIGS. 1 to 4 in the first embodiment. The systems and behaviors of the voltage transforming system 31 other than those of the timing means 36 and charging control means 37 thereof are totally common to the first and the second embodiments. Accordingly, only different parts from the voltage transforming unit 31 of the first embodiment are described hereinbelow.

Figure 6:
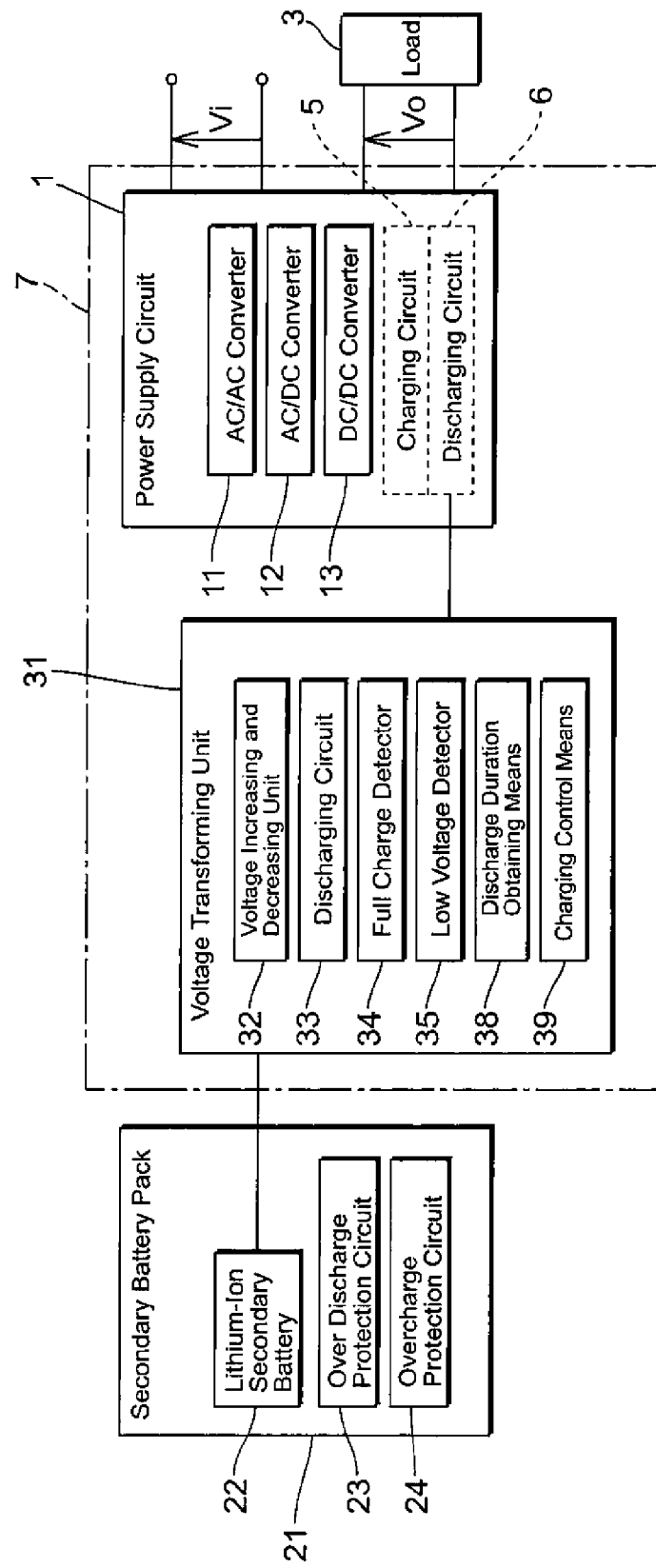
FIG. 6 is a block diagram of the uninterruptible power supply system in the second embodiment
Figure 7:
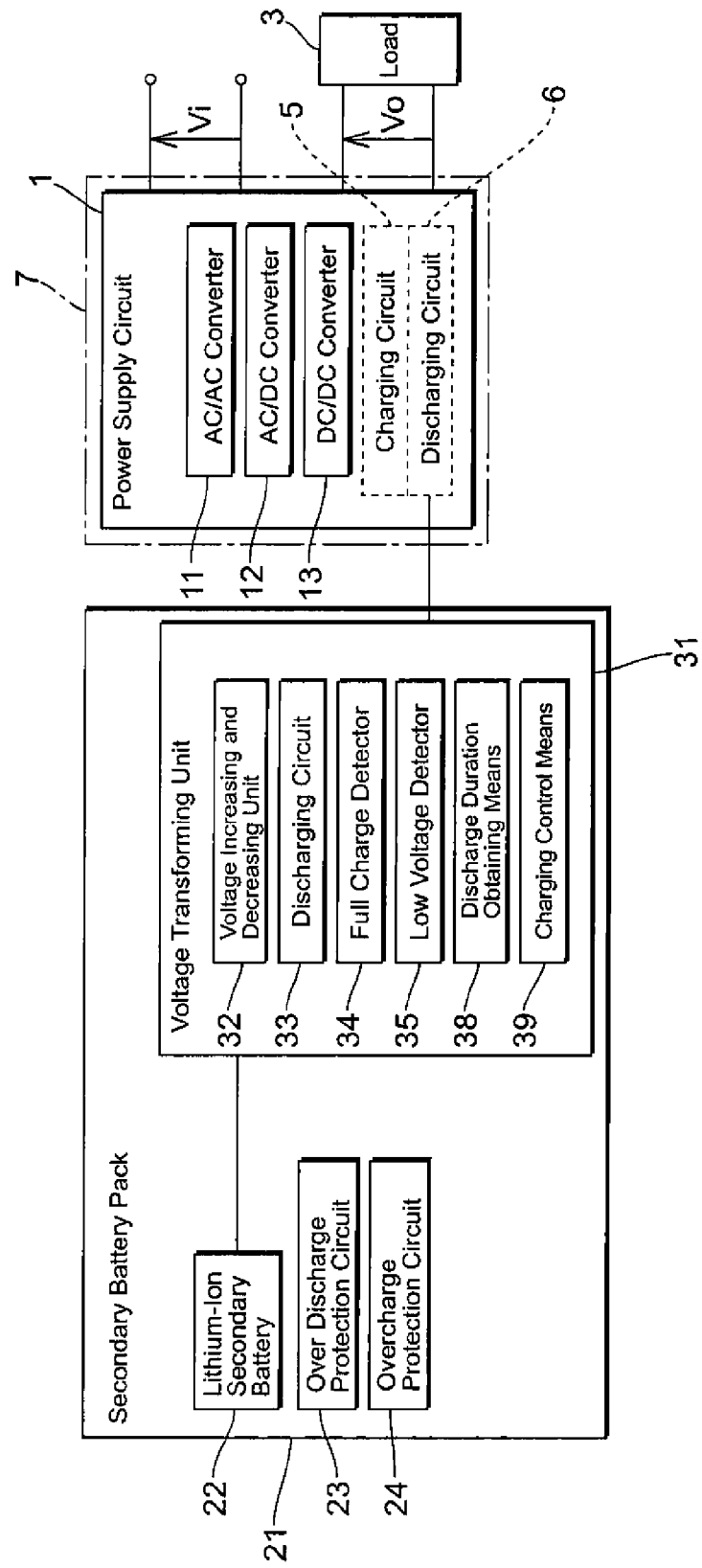
FIG. 7 is a block diagram of the uninterruptible power supply system showing a modified example of FIG. 1 in the second embodiment.
Figure 8:
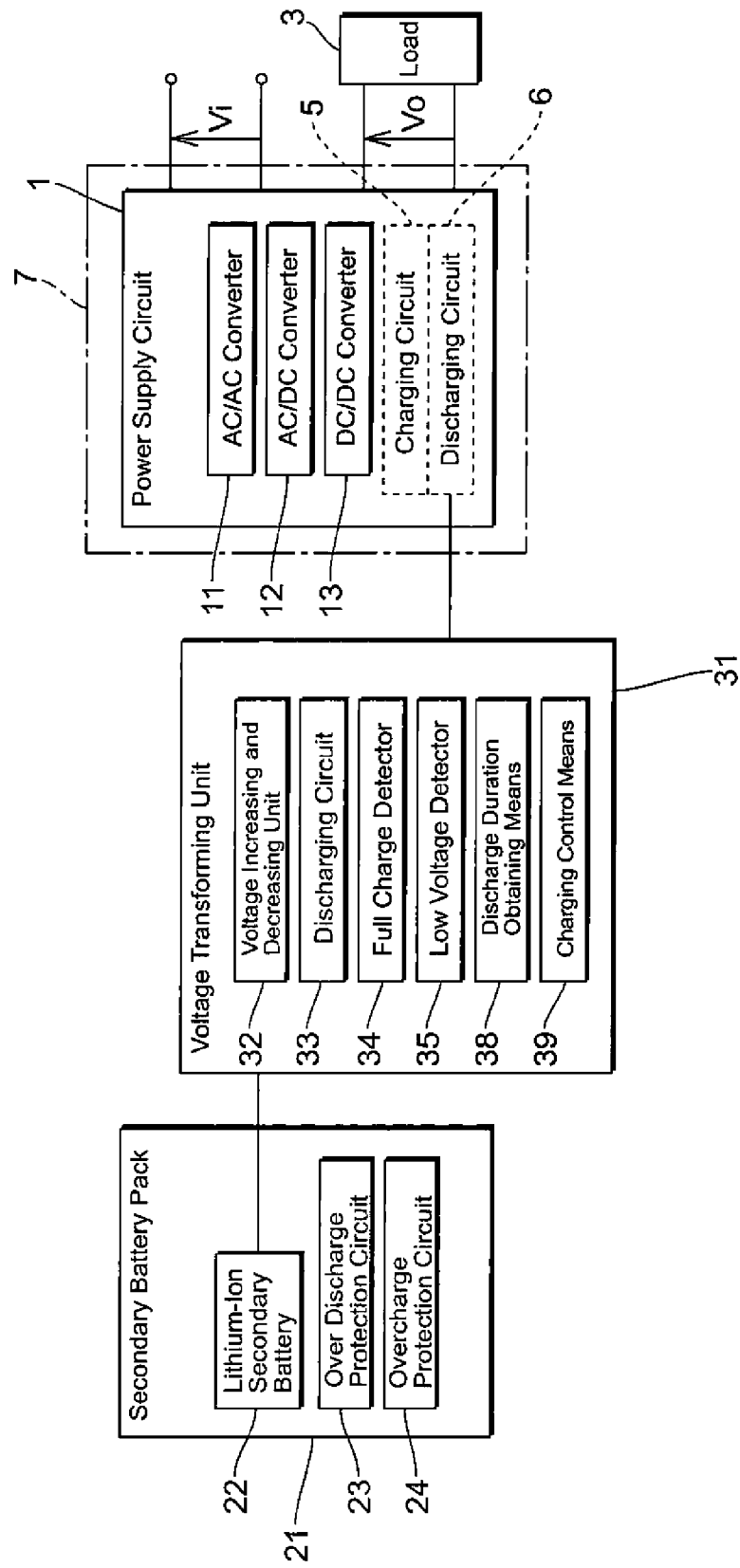
FIG. 8 is a block diagram of the uninterruptible power supply system showing a further modified example of FIG. 1 in the second embodiment.

As shown in FIGS. 6 to 8, instead of the timing means 36 and charging control means 37 in the first embodiment, the voltage transforming unit 31 in the present embodiment is equipped with a discharge duration obtaining means 38 for periodically discharging the lithium-ion secondary battery 22 and then counting a discharge duration taken for a terminal voltage of the lithium-ion secondary battery 22 to drop to a preset value preliminarily stored; and a charging control means 39 for controlling a charging voltage applied to the lithium-ion secondary battery 22 so that the discharge duration obtained in the discharge duration obtaining means 38 comes closer to a preset time slightly longer than a backup time of the loads 3 required for a system.

Figure 9:
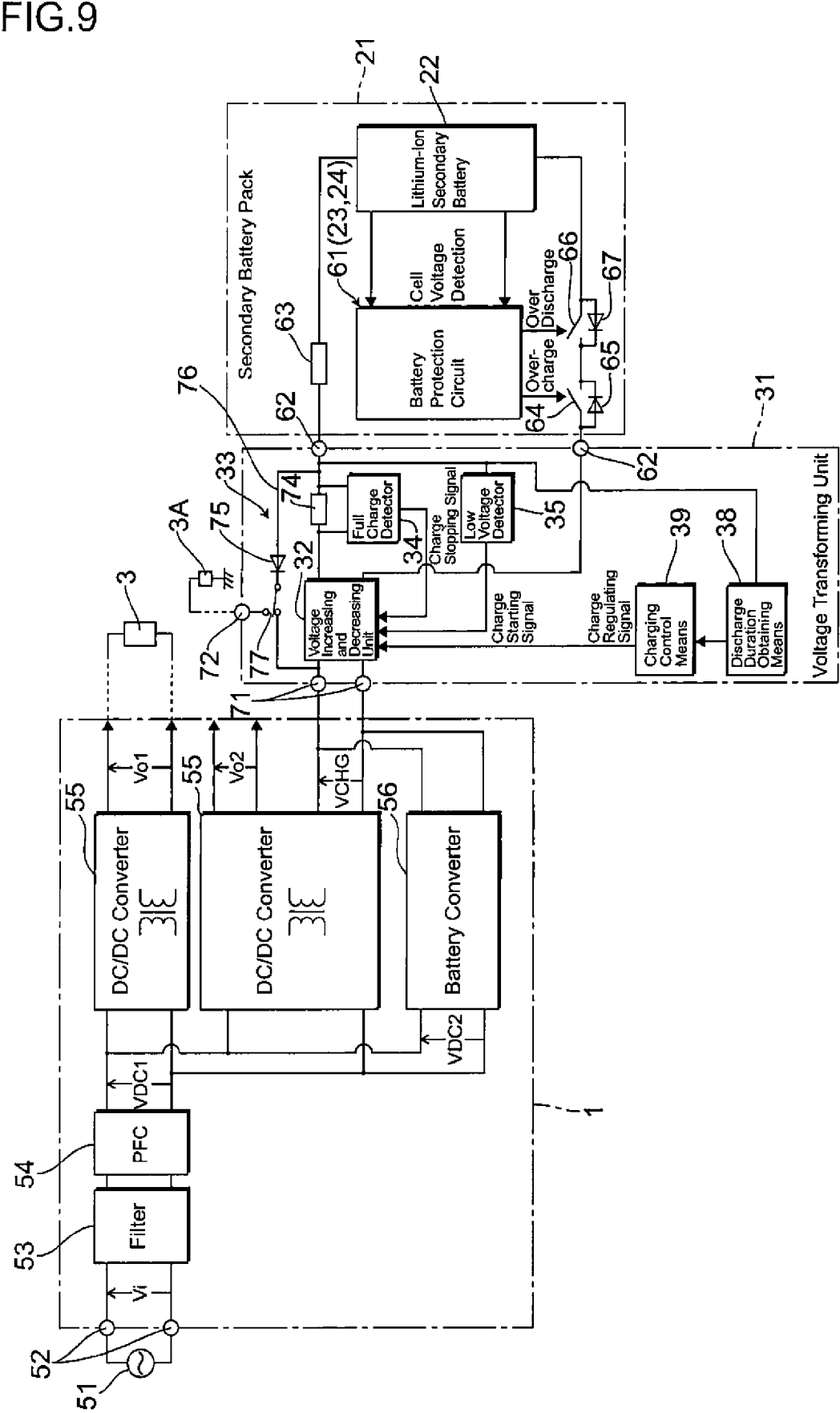
FIG. 9 is a more detailed block diagram of the uninterruptible power supply system in the second embodiment.

In accordance with the foregoing configuration, in FIG. 9, the voltage transforming unit 31 is equipped with the discharge duration obtaining means 38 and the charging control means 39. The discharge duration obtaining means 38 periodically discharges lithium-ion secondary battery 22 and then counts the discharge duration taken for the terminal voltage of the lithium-ion secondary battery 22 to drop to the preset value preliminarily stored. It is to be noted that how to perform the discharge is not specifically limited. Besides, the charging control means 39 outputs, to the voltage increasing and decreasing unit 32 consisting of the step-up chopper circuit or the step-down chopper circuit, a charge regulating signal for optimally setting and regulating the charging voltage applied to the lithium-ion secondary battery 22 so that the discharge duration obtained in the discharge duration obtaining means 38 comes closer to the preset time slightly longer than the backup time of the loads 3 required for the system.

Figure 10:
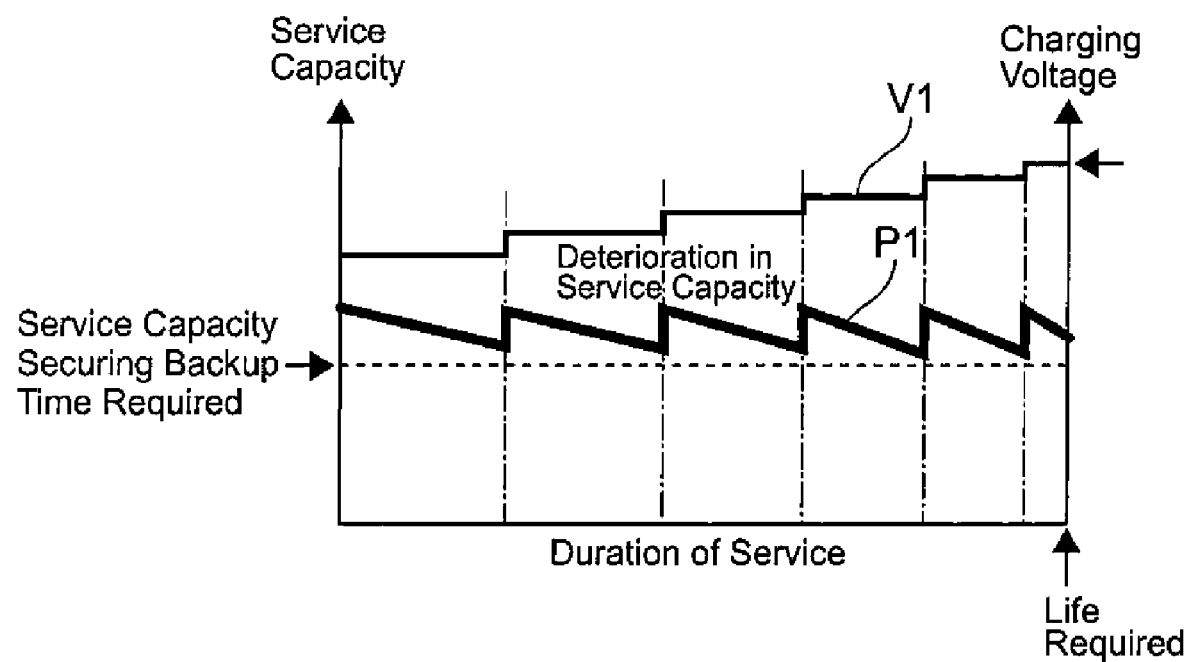
FIG. 10 is a graph showing charging voltage characteristics during duration of service of the secondary battery in the second embodiment.

Next is a description of an operation of the discharge duration obtaining means 38 and the charging control means 39 provided in the voltage transforming unit 31 with reference to a graph of FIG. 10. In the figure, reference symbol V1 denotes the charging voltage value applied from the voltage increasing and decreasing unit 32 to the lithium-ion secondary battery 22, and P1 denotes a change of discharge capacity with time. The foregoing discharge duration obtaining means 38 and the charging control means 39 may preferably comprise a microcomputer to perform various processes at high speed.

When the uninterruptible power supply starts to be operated, the discharge duration obtaining means 38 periodically discharges the lithium-ion secondary battery 22 after the lithium-ion secondary battery 22 has been fully charged. This may be caused by self-discharge, or otherwise, a resistor for discharging purpose may be connected to terminals of the lithium-ion secondary battery 22. When the lithium-ion secondary battery 22 has started to be discharged, the discharge duration obtaining means 38 starts to perform a timing operation using a built-in timer to bring in the terminal voltage of the lithium-ion secondary battery 22 and the discharge time duration taken for the terminal voltage to drop to the preset voltage value preliminarily stored, respectively. On the other band, the charging control means 39 is equipped with a determining means capable of selecting the optimal charging voltage applied to the lithium-ion secondary battery 22 based on the charging information obtained by the discharge duration obtaining means 38. The result determined is output, as a charging regulating signal, to the voltage increasing and decreasing unit 32 acting as the charging circuit of the lithium-ion secondary battery 22.

In the meantime, the optimal charging voltage referred to here means a charging voltage capable of satisfying the backup time of the loads 3 required for the system. Information indicating relationship between the discharge duration and the optimal charging voltage is preliminarily stored as a data in the microcomputer. Preferably, the data may be adjusted by taking the environment (temperature) into consideration. This is because the life of the lithium-ion secondary battery 22 is greatly affected by ambient temperature and charging voltage. Hence, the discharge duration obtaining means 38 records discharging information periodically and at the time of the power interruption to compare the thus recorded data with a data indicating the relationship between a discharge duration preliminarily input and an optimal charging voltage. Thus, the lithium-ion secondary battery 22 can be charged by a minimum necessary charging voltage to fulfill the required backup time.

Figure 11:
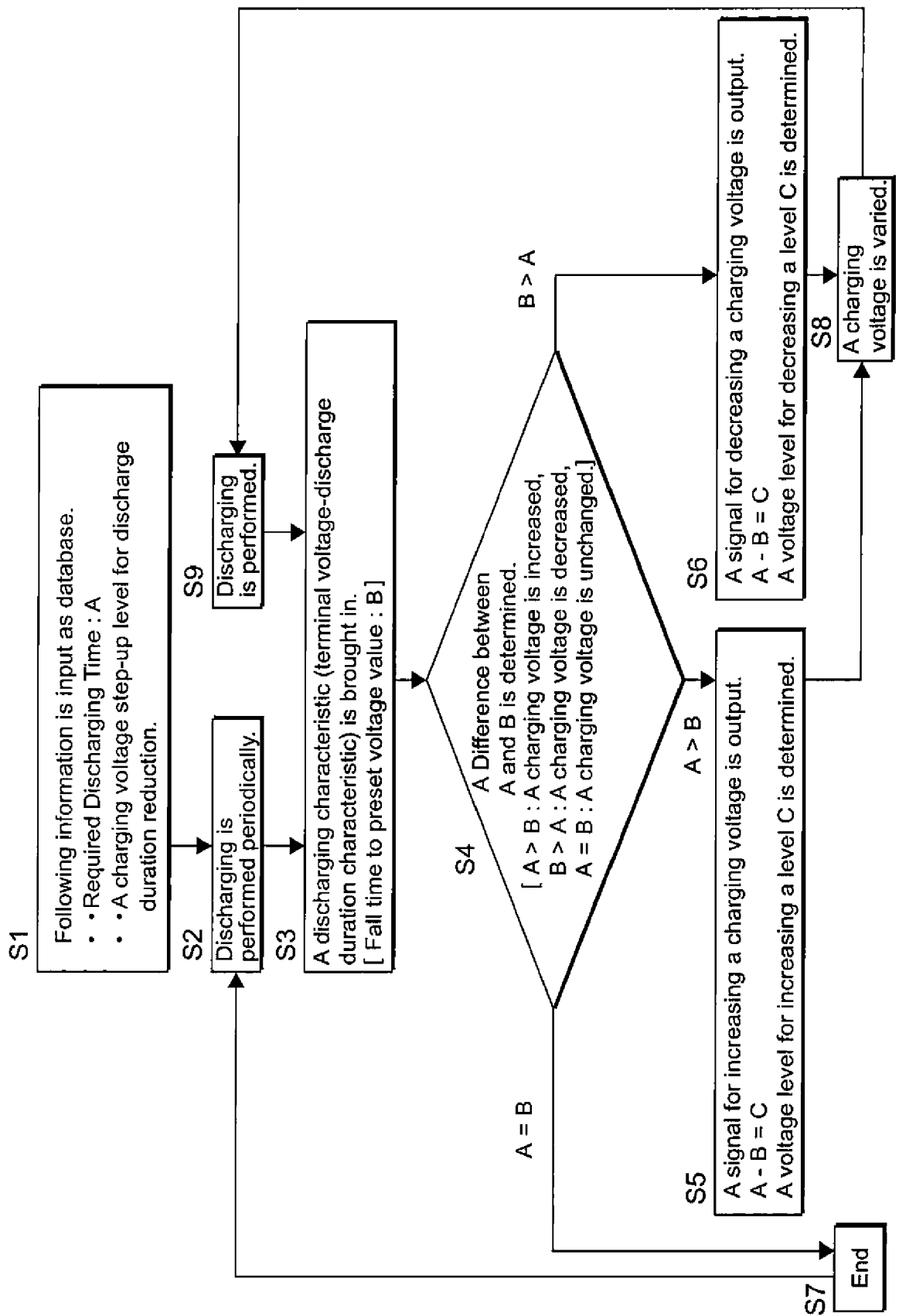
FIG. 11 is a flow chart showing the procedure for setting the charging voltage based on periodical charging information in the second embodiment.
Figure 12:
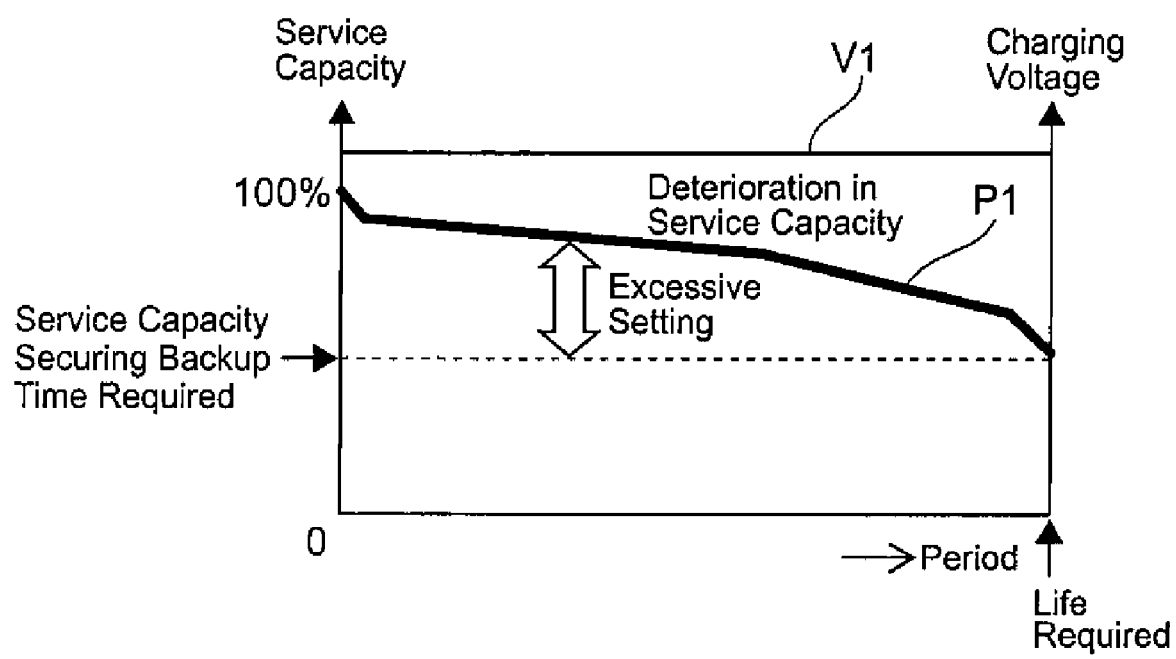
FIG. 12 is a graph showing charging-voltage and discharge-duration characteristics during duration of service of a conventional secondary battery.

FIG. 11 shows the above-mentioned control procedure in more detail. In the step S1, correlation among a required discharge duration A as a reference discharge duration when the discharge duration obtaining means 38 discharges the lithium-ion secondary battery 22, an actual discharge duration of the lithium-ion secondary battery 22 and a charging voltage set based on the required and actual discharge duration, is preliminarily stored as a data base of the microcomputer constituting the charging control means 39.

In the next step S2, the discharge duration obtaining means 38 periodically discharges the lithium-ion secondary battery 22. Then, the discharge duration obtaining means 38 counts the discharge duration taken for the terminal voltage of the lithium-ion secondary battery 22 to drop to a certain preset time preliminarily stored to thereby bring in the data counted. Namely, the discharge duration thus brought in corresponds to a fall time B taken to drop to a preset voltage value (step S3). When the discharge duration obtaining means 38 has obtained the fall time B, the charging control means 39 compares the fall time B with the required discharge duration A stored in the microcomputer to determine the difference between both. Then, if the fall time B is below the required discharge duration A, the charging time is determined to be increased to advance to the step S5, whereas if the fall time B is over the required discharge duration A, the charging time is determined to be decreased to advance to the step S6, while if the fall time B is equal to the required discharge duration A, the charging time is determined to be unchanged to conclude the control procedure (step S7).

When the charging control means 39 has determined that the charging voltage applied to the lithium-ion secondary battery 22 must be increased, then in the step S5, the charging regulating signal for increasing the charging voltage is output from the charging control means 39 to the voltage increasing and decreasing unit 32. How much to increase the charging voltage depends on a difference C(=A−B) between the required discharge duration A and the fall time B. In other words, as the fall time B becomes shorter than the required discharge duration A, an increasing level of the charging voltage is set larger.

Inversely, when the charging control means 39 has determined to decrease the charging voltage applied to the lithium-ion secondary battery 22, then, in the step S6, the charging voltage regulating signal for decreasing the charging voltage is output from the charging control means 39 to the voltage increasing and decreasing unit 32. How much to decrease the charging voltage depends on the difference C(=A−B) between the required discharge duration A and the fall time B. In other words, as the fall time B becomes longer relative to the required discharge duration A, a decreasing level of the charging voltage is set larger.

Thus, when a voltage level of the charging voltage has been newly set in the steps S5 and S6, then, in any steps, the step makes the transition to the step S8 to charge the lithium-ion secondary battery 22 with the newly set charging voltage. Then, when the terminal voltage of the lithium-ion secondary battery 22 has reached the predetermined value again, discharging is performed in the step S9 to repeat the procedures of the steps below the step S3. As a result, the charging time of the lithium-ion secondary battery 22 is regulated so that the fall time B comes closer to the required discharge duration A, i.e., so as to substantially come up to the required backup time with the requested backup time satisfied. Accordingly, based on the discharging information obtained by the discharge duration obtaining means 38, an optimal charging voltage corresponding to the required backup time can be periodically maintained to prevent life shortening of the lithium-ion secondary battery 22 caused by the overcharge at an initial stage of its use, thus being able to achieve an advantage to employing the lithium-ion secondary battery 22 as a backup power source over a long period of time.

As described above, according to the present embodiment, there is provided an interruptible power supply system in which a lithium-ion secondary battery 22 is charged when an input voltage is normal and is discharged to supply electric power to loads 3 at the time of the reduction of input voltage $V_i$ and power interruption. The uninterruptible power supply system comprises the discharge duration obtaining means 38 for periodically discharging the lithium-ion secondary battery and then counting the discharge duration taken for a terminal voltage of the lithium-ion secondary battery to drop to a preset voltage; and the charging control means 39 for variably controlling the charging voltage applied to the lithium-ion secondary battery so that the discharge duration comes closer to a preset time (a requested charge duration) slightly longer than a backup time of the loads 3 required for the system.

Accordingly, the discharge duration obtaining means counts the discharge duration taken for the terminal voltage of the lithium-ion secondary battery to drop to the preset voltage every time the lithium-ion secondary battery is discharged. The charging control means 39 variably controls the charging voltage applied to the lithium-ion secondary battery 22 so that the discharge duration comes closer to the preset time required for the system, In other words, the charging control means 39 variably the charging voltage applied to the lithium-ion secondary battery over the whole duration of service of the lithium-ion secondary battery 22 so that the discharge duration comes closer to a preset time slightly longer than the backup time of the loads 3 required for the system, and hence life shortening of the lithium-ion secondary battery 22 caused by overcharge can be prevented.

Alternatively, a life pre-announcement display for preliminarily announcing that the lithium-ion secondary battery 22 has come close to the end of its life, a battery replacement display for notifying timing for battery replacement, a display for notifying a possible backup time or the like may be displayed on a display unit (not shown) using charging information obtained by the discharge duration obtaining means 38. Furthermore, electric power consumption of the voltage increasing and decreasing unit 32 acting as the charging circuit of the lithium-ion secondary battery 22 can be reduced due to no excessive charging voltage being applied to the lithium-ion secondary battery 22.

In addition, common to each of the foregoing embodiments, an uninterruptible power supply system of the invention comprises: the lithium-ion secondary battery 22 acting as a replaceable secondary battery; and the main body case 7, acting as a power supply unit, equipped with the power supply circuit 1 acting as the main power source that supplies electric power to the lithium-ion secondary battery 22 when the input voltage $V_i$ is normal and, on the other hand, is supplied with electric power from the lithium-ion secondary battery 22 in order to keep on power supply at the time of reduction of the input voltage $V_i$ and power interruption. According to the uninterruptible power supply system, between the power supply circuit 1 and the lithium-ion secondary battery 22 is connected the voltage transforming unit 31 equipped with the voltage increasing and decreasing unit 32 for increasing or decreasing the charging voltage $V_{CHG}$ applied from the power supply circuit 1 to the lithium-ion secondary battery 22 to the optimal charging voltage.

Accordingly, when the lithium-ion secondary battery 22 according to a different specification is employed as a backup power source, the lithium-ion secondary battery 22 may be connected not directly to the power supply circuit 1 but through the voltage transforming unit 31 to the power supply circuit 1. Thus, the voltage transforming unit 31 can increase or decrease the charging voltage $V_{CHG}$, applied from the power supply circuit 1 to the lithium-ion secondary battery 22, to a voltage suitable to charge the lithium-ion secondary battery 22. Accordingly, only by allowing the voltage transforming unit 31 to intervene between the power supply circuit 1 and the lithium-ion secondary battery 22, the lithium-ion secondary battery 22 can be charged with an optimal voltage without applying any modification to an inside configuration of the power supply circuit 1. Therefore, without applying any modification to an existing electronic circuit 1, an uninterruptible power supply system can be provided in which secondary batteries according to various specifications can be used as a backup power source without any problems.

Moreover, the voltage transforming unit 31 according to the present embodiment is equipped with the full charge detector 34 for stopping power supply to the lithium-ion secondary battery 22 to allow for self-discharge of the lithium-ion secondary battery 22 when having detected that the lithium-ion secondary battery 22 has been fully charged.

Accordingly, when the voltage transforming unit 31 is built in together with a secondary battery such as the lithium-ion secondary battery 22, the full charge detector 34 provided in the voltage transforming unit 31 stops the power supply to the lithium-ion secondary battery 22 to allow for the self-discharge when having detected the fully charged state of the lithium-ion secondary battery 22. Thus, minimum necessary power can be supplied to the lithium-ion secondary battery 22 that requires no full-time power supply, so that life of the lithium-ion secondary battery 22 can be prolonged as long as possible.

Further, the voltage transforming unit 31 according to the present embodiment is equipped with a low voltage detector 35 for starting power supply to the lithium-ion secondary battery 22 when having detected that a terminal voltage of the lithium-ion secondary battery 22 had dropped to a predetermined value.

In this instance, when the terminal voltage of the Lithium-ion secondary battery 22 connected to the voltage transforming unit 31 has dropped to a predetermined value corresponding to a backup time of the loads 3, e.g., that is guaranteed by the system, the power supply to the Lithium-ion secondary battery 22 is continued until the full charge detector 34 detects the full charge. Therefore, the power supply to the loads 3 can be continued for a given length of time at the time of the input voltage $V_i$ reduction and power interruption regardless of the charged state in the lithium-ion secondary battery 22.

In addition, the present invention is not limited to the embodiments described above and various modifications are possible within the scope of the gist of the present invention. In the first embodiment, e.g., the charging voltage to the lithium-ion secondary battery is increased stepwise. As time advances, however, the charging voltage may be allowed to increase infinitely variably.

What is claimed is:

1. An uninterruptible power supply system which charges a lithium-ion secondary battery when an input voltage is normal, and discharges the same at the time of voltage reduction or power interruption to thereby supply an electric power to a load, comprising:
    a timing means for counting an elapsed time from the start of use of said lithium-ion secondary battery; and
    a charging control means for increasing a charging voltage applied to said lithium-ion secondary battery as said elapsed time increases.

2. The uninterruptible power supply system according to claim 1, wherein said charging control means sets the charging voltage to the lithium-ion secondary battery variably over the whole duration of service of said lithium-ion secondary battery so that a discharge duration thereof may become slightly longer than a backup time required for said uninterruptible power supply system.

3. The uninterruptible power supply system according to claim 1, wherein said charging control means increases the charging voltage to the lithium-ion secondary battery in stages as said elapsed time increases.

4. The uninterruptible power supply system according to claim 1, wherein said charging control means increases the charging voltage applied to the lithium-ion secondary battery continuously as said elapsed time increases.

5. The uninterruptible power supply system according to claim 1, further comprising a voltage transforming unit including a voltage increasing or decreasing unit for increasing or decreasing a supply voltage applied from a power supply circuit to the lithium-ion secondary battery to an optimal charging voltage applied to said lithium-ion secondary battery, said voltage transforming unit being provided between said power supply circuit and the lithium-ion secondary battery with said timing means and charging control means being incorporated in said voltage transforming unit.

6. The uninterruptible power supply system according to claim 5, wherein said voltage transforming unit comprises a full charge detector which stops power supply to the lithium-ion secondary battery and then allows the lithium-ion secondary battery to perform self-discharge upon detecting the lithium-ion secondary battery has been charged fully.

7. The uninterruptible power supply system according to claim 5, wherein said voltage transforming unit comprises a low-voltage detector which starts power supply to the lithium-ion secondary battery upon detecting a terminal voltage of the lithium-ion secondary battery has dropped to a preset value.

8. An uninterruptible power supply system which charges a lithium-ion secondary battery when an input voltage is normal, and discharges the same at the time of voltage reduction and power interruption to thereby supply an electric power to a load, comprising:
 a discharge duration obtaining means for discharging the lithium-ion secondary battery and then counting the discharge duration taken for a terminal voltage of the lithium-ion secondary battery to drop to a preset voltage; and
 a charging control means for controlling a charging voltage applied to the lithium-ion secondary battery variably so that the discharge duration comes closer to a preset time.

9. The uninterruptible power supply system according to claim 8, wherein said charging control means sets the charging voltage applied to the lithium-ion secondary battery variably over the whole duration of service of said lithium-ion secondary battery so that the discharge duration thereof may come closer to said preset time that is slightly longer than a backup time required for said uninterruptible power supply system.

10. The uninterruptible power supply system according to claim 8, wherein said charging control means increases the charging voltage applied to said lithium-ion secondary battery when said discharge duration is shorter than said preset time as preliminarily stored, but decreases the charging voltage when said discharge duration is longer than said preset time, while said charging control means keeps the charging voltage unchanged when said discharge duration is equal to said preset time.

11. The uninterruptible power supply system according to claim 8, further comprising a voltage transforming unit including a voltage increasing and decreasing unit for increasing and decreasing a supply voltage applied from a power supply circuit to said lithium-ion secondary battery to an optimal charging voltage to said lithium-ion secondary battery, said voltage transforming unit being provided between said power supply circuit and said lithium-ion secondary battery with said discharge duration obtaining means and charging control means being incorporated in said voltage transforming unit.

12. The uninterruptible power supply system according to claim 11, wherein said voltage transforming unit comprises a full charge detection element which stops power supply to said lithium-ion secondary battery and then allows the lithium-ion secondary battery to perform self-discharge upon detecting the lithium-ion secondary battery has been charged fully.

13. The uninterruptible power supply system according to claim 11, wherein said voltage transforming unit comprises a low-voltage detector which starts power supply to said lithium-ion secondary battery upon detecting a terminal voltage of the lithium-ion secondary battery has dropped to a preset value.

* * * * *